US012639718B2

(12) United States Patent
Jurss et al.

(10) Patent No.: US 12,639,718 B2
(45) Date of Patent: *May 26, 2026

(54) DIGITAL ACCESS CODE

(71) Applicant: Visa International Service Association, San Francisco, CA (US)

(72) Inventors: Penny Jurss, Leander, TX (US);
Rowena McCallister, Evergreen, CO (US); Bradford Crouch, Highlands Ranch, CO (US); Suresh Kalakrishnan, Cedar Park, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,237

(22) Filed: Feb. 23, 2023

(65) Prior Publication Data

US 2023/0196377 A1 Jun. 22, 2023

Related U.S. Application Data

(63) Continuation of application No. 16/979,854, filed as application No. PCT/US2019/021818 on Mar. 12, 2019, now Pat. No. 11,631,085.

(Continued)

(51) Int. Cl.
*G06Q 20/40* (2012.01)
*G06Q 20/10* (2012.01)
*G06Q 20/32* (2012.01)

(52) U.S. Cl.
CPC ... *G06Q 20/40975* (2013.01); *G06Q 20/1085* (2013.01); *G06Q 20/3223* (2013.01);
(Continued)

(58) Field of Classification Search
None
See application file for complete search history.

(56) References Cited

U.S. PATENT DOCUMENTS 8,639,629 B1      1/2014 Hoffman
10,387,876 B1 *   8/2019 Buentello ............ G06Q 20/405
(Continued)

FOREIGN PATENT DOCUMENTS

CN         1196647 A     10/1998
CN        104054095 A     9/2014
(Continued)

OTHER PUBLICATIONS

U.S. Appl. No. 16/979,854, Final Office Action, mailed on Sep. 9, 2022, 11 pages.

(Continued)

*Primary Examiner* — Chrystina E Zelaskiewicz
(74) *Attorney, Agent, or Firm* — Kilpatrick Townsend & Stockton LLP

(57) ABSTRACT

A method is disclosed. One embodiment of the invention is directed to a method. The method comprises: prompting, by an access device, a user to enter an access code; receiving, by the access device, the access code from the user; transmitting, by the access device, the access code to a validation computer, which validates the access code; receiving, by the access device, an access identifier or access token from the validation computer in response to validating the access code; transmitting, by the access device, an authorization request message including the access identifier or the access token to an authorizing computer; and receiving, by the access device, an authorization response message from the authorizing computer.

18 Claims, 14 Drawing Sheets

Related U.S. Application Data

(60) Provisional application No. 62/641,928, filed on Mar. 12, 2018.

(52) U.S. Cl.
CPC ..... *G06Q 20/3224* (2013.01); *G06Q 20/3226* (2013.01); *G06Q 20/326* (2020.05); *G06Q 20/4012* (2013.01)

(56) References Cited

U.S. PATENT DOCUMENTS

| | | | | |
|---|---|---|---|---|
| 10,535,047 B1* | 1/2020 | Thomas | | G06Q 20/326 |
| 11,631,085 B2 | 4/2023 | Jurss et al. | | |
| 11,715,084 B1* | 8/2023 | Dixon | | G06Q 20/22 |
| | | | | 705/44 |
| 2009/0063345 A1 | 3/2009 | Erikson | | |
| 2010/0250410 A1 | 9/2010 | Song et al. | | |
| 2011/0055077 A1 | 3/2011 | French et al. | | |
| 2011/0302083 A1 | 12/2011 | Bhinder | | |
| 2012/0132704 A1 | 5/2012 | Black | | |
| 2013/0073467 A1* | 3/2013 | Underwood | | G06Q 20/3223 |
| | | | | 705/43 |
| 2014/0143137 A1* | 5/2014 | Carlson | | G06Q 20/18 |
| | | | | 705/39 |
| 2015/0089607 A1 | 3/2015 | Hubner et al. | | |
| 2016/0019537 A1 | 1/2016 | Raja et al. | | |
| 2016/0247155 A1* | 8/2016 | Hammad | | G06Q 40/00 |
| 2016/0285881 A1 | 9/2016 | Huber et al. | | |
| 2016/0300226 A1* | 10/2016 | Novac | | G06Q 20/4016 |
| 2017/0124544 A1* | 5/2017 | Recriwal | | G06Q 20/326 |
| 2018/0068297 A1* | 3/2018 | Goodman | | G06Q 20/401 |

| | | | | |
|---|---|---|---|---|
| 2019/0005474 A1* | 1/2019 | Cady | | G06Q 20/3223 |
| 2019/0196935 A1* | 6/2019 | Edwards | | G06Q 20/3223 |
| 2022/0083996 A1 | 3/2022 | Baber et al. | | |
| 2022/0383325 A1 | 12/2022 | Hoffman | | |

FOREIGN PATENT DOCUMENTS

| | | |
|---|---|---|
| CN | 105144216 A | 12/2015 |
| CN | 105453524 A | 3/2016 |
| CN | 105960776 A | 9/2016 |
| EP | 2874112 A1 | 5/2015 |
| WO | 2016014125 A1 | 1/2016 |

OTHER PUBLICATIONS

U.S. Appl. No. 16/979,854, First Action Interview Office Action Summary, mailed on Mar. 22, 2022, 7 pages.
U.S. Appl. No. 16/979,854, First Action Interview Pilot Program Pre-Interview Communication, mailed on Feb. 1, 2022, 7 pages.
U.S. Appl. No. 16/979,854, Notice of Allowance, mailed on Jan. 4, 2023, 14 pages.
Application No. PCT/US2019/021818, International Preliminary Report on Patentability, mailed on Sep. 24, 2020, 8 pages.
Application No. PCT/US2019/021818, International Search Report and Written Opinion, mailed on Jun. 25, 2019, 12 pages.
Application No. SG11202008525S, Written Opinion, mailed on Jul. 29, 2022, 8 pages.
Notice of Decision to Grant, mailed Sep. 28, 2023, in Chinese Application No. CN201980018871.7 , 9 pages.
Application No. SG11202008525S , Further Written Opinion, Mailed On Jan. 4, 2024, 5 pages.

* cited by examiner

Validation Computer 408

Mobile Application Backend Server 406

Mobile Application 404

User 402

410

412

400

Validation Computer 506

508

512

Mobile Application Backend Server 504

510

Mobile Application 502

User 500

508

500

Home Page

Display Code

Find supported ATM

1300

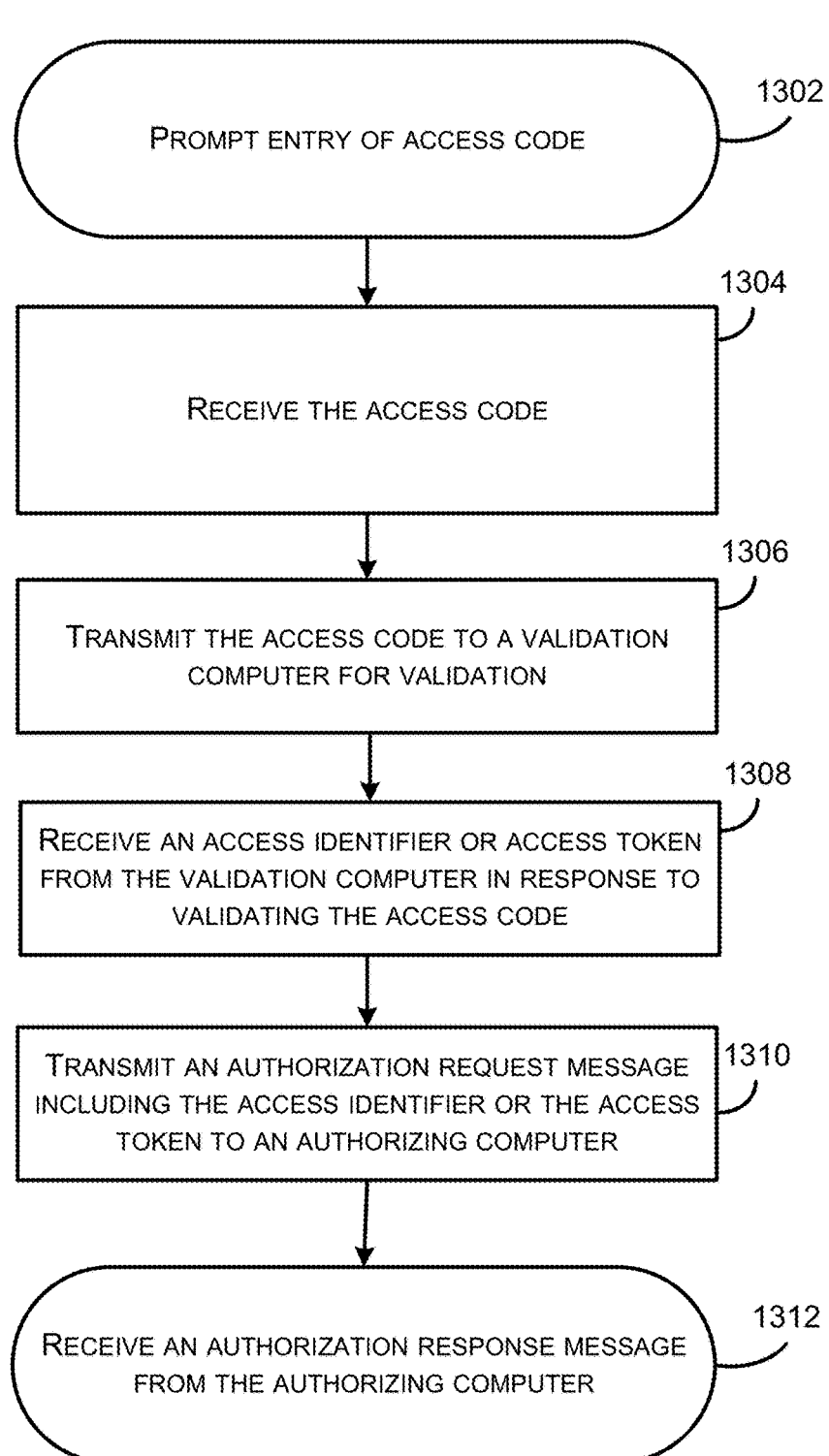

PROMPT ENTRY OF ACCESS CODE    1302

RECEIVE THE ACCESS CODE    1304

TRANSMIT THE ACCESS CODE TO A VALIDATION COMPUTER FOR VALIDATION    1306

RECEIVE AN ACCESS IDENTIFIER OR ACCESS TOKEN FROM THE VALIDATION COMPUTER IN RESPONSE TO VALIDATING THE ACCESS CODE    1308

TRANSMIT AN AUTHORIZATION REQUEST MESSAGE INCLUDING THE ACCESS IDENTIFIER OR THE ACCESS TOKEN TO AN AUTHORIZING COMPUTER    1310

RECEIVE AN AUTHORIZATION RESPONSE MESSAGE FROM THE AUTHORIZING COMPUTER    1312

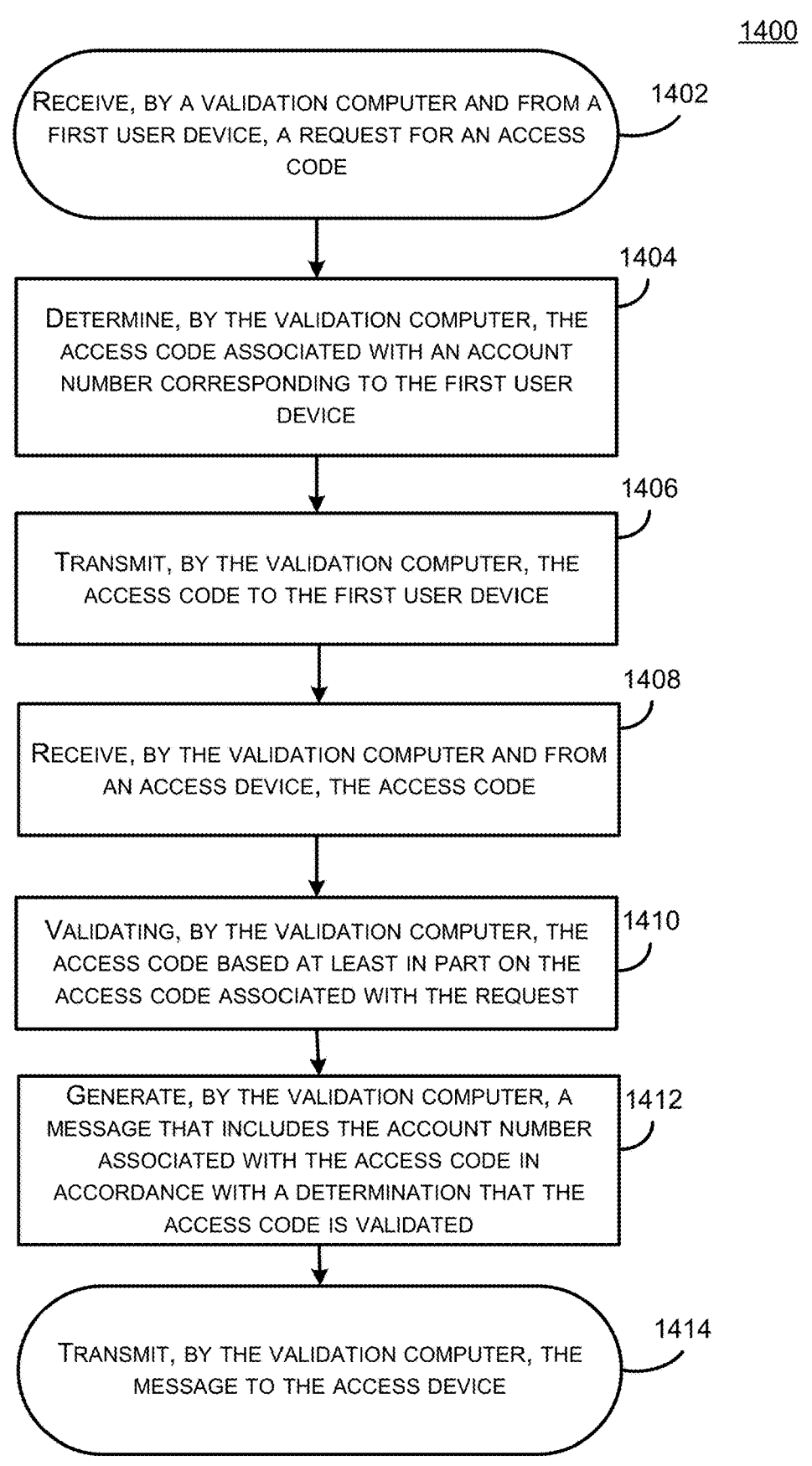

RECEIVE, BY A VALIDATION COMPUTER AND FROM A FIRST USER DEVICE, A REQUEST FOR AN ACCESS CODE ⟶ 1402

DETERMINE, BY THE VALIDATION COMPUTER, THE ACCESS CODE ASSOCIATED WITH AN ACCOUNT NUMBER CORRESPONDING TO THE FIRST USER DEVICE ⟶ 1404

TRANSMIT, BY THE VALIDATION COMPUTER, THE ACCESS CODE TO THE FIRST USER DEVICE ⟶ 1406

RECEIVE, BY THE VALIDATION COMPUTER AND FROM AN ACCESS DEVICE, THE ACCESS CODE ⟶ 1408

VALIDATING, BY THE VALIDATION COMPUTER, THE ACCESS CODE BASED AT LEAST IN PART ON THE ACCESS CODE ASSOCIATED WITH THE REQUEST ⟶ 1410

GENERATE, BY THE VALIDATION COMPUTER, A MESSAGE THAT INCLUDES THE ACCOUNT NUMBER ASSOCIATED WITH THE ACCESS CODE IN ACCORDANCE WITH A DETERMINATION THAT THE ACCESS CODE IS VALIDATED ⟶ 1412

TRANSMIT, BY THE VALIDATION COMPUTER, THE MESSAGE TO THE ACCESS DEVICE ⟶ 1414

FIG. 14

DIGITAL ACCESS CODE

CROSS-REFERENCE TO RELATED APPLICATIONS

This application is a continuation of U.S. patent application Ser. No. 16/979,854, filed Sep. 10, 2020, which is a U.S. National Phase Application of International Patent Application No. PCT/US2019/021818, filed Mar. 12, 2019, which claims priority to U.S. Patent Application No. 62/641,928, filed on Mar. 12, 2018, the disclosure of which are herein incorporated by reference in their entirety for all purposes.

BACKGROUND

It is possible for a fraudster to steal payment credentials when a user enters account information during a transactions. For example, card skimmers or cameras can be used to gain payment credentials or account information as a user enters the account information during a transaction (e.g., entering an account number on a keypad of an automated teller machine (ATM)). Current fraud prevention techniques to protect payment credentials or account information may be limited to further authentication techniques which still require a user to provide sensitive information which also may be obtained or stolen by fraudsters. In addition, implementing additional authentication techniques may slow down the authentication and ultimately the authorization process such that interactions by users are reduced. Improved access systems are desired.

Embodiments of the invention address these and other problems, individually and collectively.

BRIEF SUMMARY

Embodiments of the disclosure are directed method and systems for hands free interaction at a specific location. Through the user of a user device, a user may request and receive an access code to initiate a transaction at an access device in lieu of using a physical device such as a card to access a resource obtained through the access device. The access code may be transmitted to a user device via a particular communication channel and may be associated with an expiration time period, which limits the time period with which the code can be used to conduct a transaction at the access device, thereby increasing security.

Some embodiments of the invention include a method including prompting, by an access device, a user to enter an access code; receiving, by the access device, the access code from the user; transmitting, by the access device, the access code to a validation computer, which validates the access code; receiving, by the access device, an access identifier or access token from the validation computer in response to validating the access code; transmitting, by the access device, an authorization request message including the access identifier or the access token to an authorizing computer; and receiving, by the access device, an authorization response message from the authorizing computer.

In some embodiments, the access device is an automated teller machine (ATM). In some embodiments, the method further includes, after receiving the access identifier or the access token: prompting, by the access device, the user for a personal identifier comprising a PIN. In some embodiments, the authorization request message includes the access identifier or the access token and the personal identifier. In some embodiments, the method further includes generating a notification indicating a result of authorization by the authorizing computer; and transmitting the notification to a user device associated with the user. In some embodiments, the notification includes an access code and a geographic location of the access device associated with the authorization. In some embodiments, the authorizing computer maintains information including an account number associated with the user, the type of transaction being conducted, a monetary amount of the transaction, and the personal identifier of the user.

Embodiments of the invention are further directed to an access device including a processor; a wireless communication device coupled to the processor; and a memory element including instructions that, when executed with the processor, cause the system to at least: prompt a user for an access code; receive the access code from the user; transmit the access code to a validation computer for validation; receive an access identifier or access token in response to validating the access code by the validation computer; transmit an authorization request message including the access identifier or the access token to an authorizing computer; and receive, from the authorizing computer, an authorization response message. The memory element can include code, executable with the processor, for implementing any of the methods described herein.

Embodiments of the invention further include a computer-implemented method including receiving, by a validation computer and from a first user device, a request for an access code; determining, by the validation computer, the access code associated with an account number corresponding to the first user device; transmitting, by the validation computer, the access code to the first user device; receiving, by the validation computer and from an access device, the access code; validating, by the validation computer, the access code based at least in part on the access code associated with the request; generating, by the validation computer, a message that includes the account number associated with the access code in accordance with a determination that the access code is validated; and transmitting, by the validation computer, the message to the access device.

In some embodiments, determining the access code further includes determining an expiration time period associated with the access code. In some embodiments, the expiration time period is specified by a user associated with the first user device. In some embodiments, the expiration time period is transmitted with the access code to the first user device in response to the request for the access code. In some embodiments, the computer-implemented method further includes determining one or more geographic locations for access devices that are configured to utilize the access code.

In some embodiments, the computer-implemented method further includes updating a user interface of the first user device to display the one or more geographic locations for the access devices in response to the request for the access code. In some embodiments, determining the access code associated with the account number is in response to a user authenticating with the first user device prior to requesting the access code. In some embodiments, the validating computer maintains information that identifies a delivery channel preference for the access code.

In some embodiments, the validation computer and access device communicate by invoking an application programming interface (API) that uses mutual secure socket layer authentication and channel encryption. In some embodiments, the computer-implemented method further includes: receiving, by the validation computer, the access code from a second user device; validating, by the validation computer, the access code based at least in part on the access code associated with the request; generating, by the validation computer, a message that includes the account number associated with the access code in accordance with a determination that the access code is validating; and transmitting, by the validation computer, the message to the access device. In some embodiments, the computer-implemented method further includes: generating, by the validation computer, a notification indicating that the access code has been used by the second user device; and transmitting, by the validation computer, the notification to the first user device.

These and other embodiments of the invention are described in further detail below.

BRIEF DESCRIPTION OF THE DRAWINGS

FIG. 13 shows a flowchart illustrating a method according to an embodiment of the invention; and FIG. 14 shows a flowchart illustrating a method according to an embodiment of the invention.

DETAILED DESCRIPTION

Figure 1:
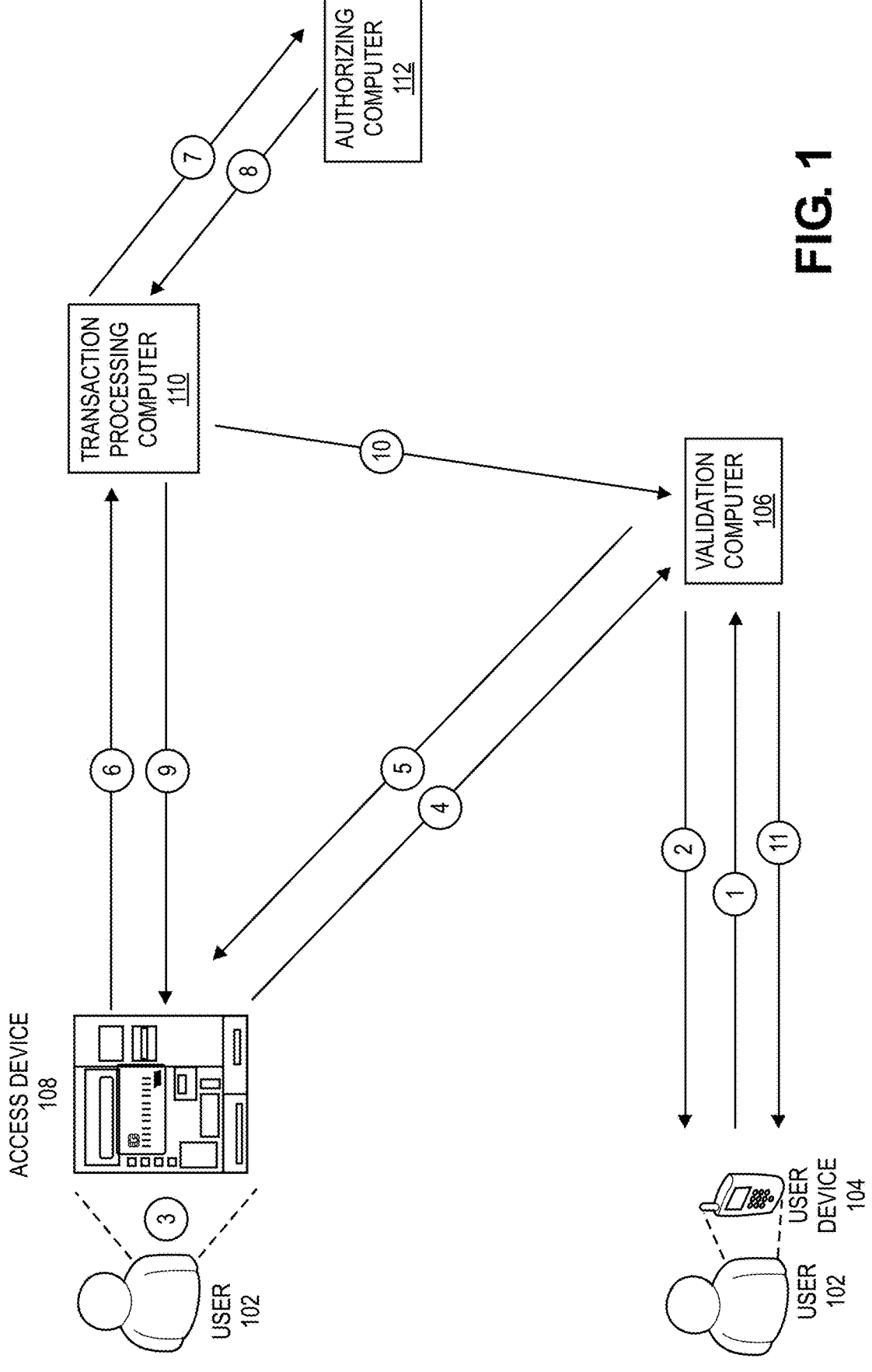
FIG. 1 depicts a block diagram of a system and a process flow according to an embodiment of the invention.

Embodiments of the invention are directed to systems and methods for improving upon conventional interaction systems. In some embodiments, a user may utilize a user device to request and receive an access code to be used at an access device, such as an ATM, to initiate any ATM transaction (e.g., deposit, withdrawal, transfer, etc.,) in lieu of using a physical card with payment credentials. In embodiments, the access code may be a one-time use access code that is unique from other one-time use access codes. The access code may be associated with an expiration time period that is configurable by an entity such as an issuer or by the user themselves. The access code may be configured to work with an ATM only within the time window before the expiration time period expires. For example, a certain access code may be associated with a 30 minute expiration time period. A user who receives such an access code may only use the access code during the 30 minute time window at an ATM.

In accordance with at least one embodiment, upon the user interacting with an access device and providing the access code, the access device may communicate, via networks, with a validating server or computer for validating the received access code. If the access code is validated by the validating computer, the validating computer may identify payment account information associated with the requesting entity (e.g., user or user device) and transfer an access identifier or access token to the access device. The access device may request a personal identifier or PIN from the user upon receiving the access code, and the access identifier or the access token. In embodiments, the access device may communicate with an authorizing computer for authorizing the transaction initiated by the user at the access device (e.g., a withdrawal). The access device may generate and transmit the authorization request message that includes the access code, the access identifier or the access token, and other transaction information such as a type of transaction, an amount of the transaction, etc., to the authorizing computer for authorization of the transaction.

Embodiments of the invention provide several advantages. For example, in some embodiments a user does not have to enter any sensitive account information into any device including the access device during a transaction. In embodiments, the user can initiate and conduct a transaction with an access device without presenting or physically interacting with a card that includes relevant payment account information with the access device, as is conventionally required to conduct a transaction at an access device. Authentication and ultimately authorization processes are made more efficient by the embodiments of the invention as a transaction need not proceed to generate and transmit an authorization request message if an access code is not validated by a validation computer. In addition, with embodiments of the invention, fraudsters are unable to utilize electronic card skimmers or other skimming devices such as cameras to obtain or otherwise steal sensitive account information. Embodiments of the present invention also provide for multiple authentication points ensuring more security during a transaction. For example, a user may be required to authenticate with an application of their user device to request the access code, provide the appropriate access code at the ATM, and provide a corresponding appropriate PIN to conduct the transaction at the access device. Additional advantages may be achieved by informing the user, via a graphical user interface of the user device, of locations of geographically close access devices that are configured to utilize the access code. Other advantages include the presentation of notifications of successful transactions utilizing the access code by the user or by other authorized users.

Prior to discussing the details of some embodiments of the present invention, description of some terms may be helpful in understanding the various embodiments.

An "access device" may be any suitable device that provides access to a system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile communication device. The POS terminal may or may not initiate processing of transactions. In some embodiments, a access device may enable financial transactions without the need for a resource provider entity to be present. The access device may implement a secure cryptoprocessor for implementing cryptographic operations of sensitive information provided by and/or associated with a user. The access device may include a number of alarms, housing, tamper resistance mechanisms that prevent physical access. An access device may implement one or more authentication provisioning mechanisms, such as a key pad for entering a personal identification number, access code, or a biometric scanner for processing user provided biometrics (finger prints, iris, facial recognition, etc.).

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, interacting with access devices, and/or the like for retail purchases, digital goods purchases, utility payments, purchasing games or gaming credits from gaming websites, transferring funds between users, and/or the like.

An "access token" may include a substitute identifier for a real identifier to gain access to a resource. An example of an "access token" can be an "account token."

An "account token" may include a substitute identifier for some information. For example, a payment token may include an identifier for a payment account that is a substitute for an account identifier, such as a primary account number (PAN) or account number. For instance, an account token may include a series of alphanumeric characters that may be used as a substitute for an original account identifier. For example, an account token "4900 0000 0000 0001" may be used in place of a PAN "4147 0900 0000 1234." In some embodiments, an account token may be "format preserving" and may have a numeric format that conforms to the account identifiers used in existing payment processing networks (e.g., ISO 8583 financial transaction message format). In some embodiments, an account token may be used in place of a PAN to initiate, authorize, settle or resolve a payment transaction. The account token may also be used to represent the original credential in other systems where the original credential would typically be provided. In some embodiments, an account token value may be generated such that the recovery of the original PAN or other account identifier from the token value may not be computationally derived. Further, in some embodiments, the account token format may be configured to allow the entity receiving the account token to identify it as an account token and recognize the entity that issued the account token.

An "access code" may be a unique alpha-numeric string generated by a validation computer that is associated with a payment account or account information of a user. An access code may be valid for only a certain time period as indicated by the associated expiration time period.

An "expiration time period" may represent a range of time that an access code may be valid for use by a requesting user. In embodiments, the expiration time period can be specified by a user (by interacting with a user device or first user device) requesting the access code or by another entity such as an issuer or validation computer. The expiration time period can be for any suitable time range including seconds, minutes, or hours. For example, a given expiration time period could be thirty minutes or as little as one minute.

A "validation computer" may include one or more devices that can validate data. In some embodiments, it can process access code requests. An exemplary validation computer may include data processing subsystems, networks, and operations used to generate, maintain, and transmit access codes as well as payment account information to requesting entities. A validation computer may validate access codes in response to communications with user devices or access devices. A validation computer may be in communication with an authorizing computer. In embodiments, the validation computer may be configured for generating and transmitting notifications or messages to an access device or a user device regarding the status and/or user of an access code.

A "user" may include an individual. In some embodiments, a user may be associated with a first user device or a user device. The user may be associated with one or more accounts and/or personal accounts. The user may also be referred to as a cardholder, account holder, or consumer. A user may authorize another user (a second user) to utilize a second user device for providing an access code to an access device in accordance with embodiments described herein.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be a message that requests permission to conduct an interaction. For example, an authorization request message may include an electronic message that is sent to a payment processing network and/or an authorizing computer operated by an issuer of a payment card to request authorization for a transaction. In embodiments, an authorizing computer may send an authorization request message to an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise an access identifier or an access token, and/or additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an authorizing computer operated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant. In some embodiments, a payment network or issuer may generate or forward the authorization response message to an authorizing computer that indicates approval of a transaction or declining of a transaction.

An "authorizing entity" may be an entity that authorizes a request. Examples of an authorizing entity may be an issuer, a governmental agency, a document repository, an access administrator, etc. An "authorizing computer" may be a computer operated by or associated with an authorizing entity and may be implemented by, for example, a server computer.

An "issuer" may typically refer to a business entity (e.g., a bank) that maintains an account for a user. An issuer may also issue payment credentials stored on communications devices.

A "resource provider" may be an entity that can provide a resource such as goods, services, information, and/or access. Examples of a resource provider include merchants. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "transaction processing computer" may include a computer that processes transaction. It may be in a network of one or more devices that can process and route transaction request messages. An exemplary transaction processing computer may include data processing subsystems, networks, and operations used to support and deliver authorization services, exception file services, transaction scoring services, and clearing and settlement services. A system that has a transaction processing computer may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "user device" may comprise a device that may be transported and operated by a user. A user device can be a "mobile communication device," which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device). A mobile communication device may be configured to utilize an application for communicating with a validation computer, an access device, an authorizing computer, or other entities described herein for enabling the digital access code features described in embodiments herein. A mobile communication device may be configured to run one or more software applications such as mobile applications or a digital wallet application.

An "application" may be computer code or other data stored on a computer readable medium (e.g., memory element or secure element) that may be executable by a processor to complete a task. An application may include a mobile application or a digital wallet. An application may be designed to streamline the process for accessing or otherwise interacting with an access device to conduct a transaction. An application may allow the user to request an access code, select one or more access credentials, and conduct a transaction or request access to secure data at an access device without presenting a physical card (such as an identification or access card).

Details of some embodiments of the present invention will now be described. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. For example, memory elements, processors, and storage are present in the user device 102, access device 108, validation computer 106, transaction processing computer 110, and authorizing computer 112 but are not specifically illustrated for clarify of illustration.

FIG. 1 depicts a block diagram of a system and a process flow according to an embodiment of the invention. FIG. 1 illustrates at least some of the components for implementing embodiments of the invention. FIG. 1 includes a user 102, a user device 104, a validation computer 106, an access device 108, a transaction processing computer 110, and an authorizing computer 112. In embodiments, the access device 108 may include a processor and a wireless communications device for communicating with the user device 104 as well as the validation computer 106 and transaction processing computer 110. In embodiments, the access device 108, validation computer 106, and transaction processing computer 110 may communicate via available networks including the Internet via wireless or wired communication channels.

The user 102 may be associated with user device 104, which utilizes an application and/or a digital wallet that is further associated with one or more payment accounts or account information maintained by the authorizing computer 112. In embodiments, the application of the user device 104 may be configured to present, maintain, and update a user interface enabling the user 102 to request and receive an access code from the validation computer 106. In some embodiments, the user interface of the application of user device 104 may be configured to display geographic locations of one or more access devices (e.g., access device 108) for utilizing the access code for conducting a transaction without presenting a physical card. The user device 104 may be configured to utilize geo-location software and hardware for identifying a location of the user device as well as identifying distances between the user device and the locations of one or more access devices (such as access device 108) configured to utilize the access code.

The access device 108 may be any suitable device having wireless or wired communication capabilities and be capable of conducting any of the methods described herein. The access device 108 may comprise a processor and wireless or wired communication device. In embodiments, the access device 108 may be an automated teller machine (e.g., EMV enabled terminal, etc.,) that can enable financial transactions without the need for a human bank teller. The access device 108 may be configured to receive an access code from user 102 as well as a personal identifier or PIN from user 102. The access device 108 may be configured to generate and transmit a validation message to the validation computer 106 for validating the access code provided by user 102 as well as receiving the result of the validation from the validation computer 106. The access device 108 may be configured to receive an access identifier (e.g., a primary account number) or access token (e.g., payment token) from the validation computer 106. The access device 108 may be configured to generate and transmit an authorization request message from the access device 108 to the transaction processing computer 110 as well as receive an authorization response message from the transaction processing computer 110 for conducting a transaction with the user 102. The access device 108 may include hardware that carries out instructions embodied as code in a computer-readable medium (e.g., non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

The transaction processing computer 110 may be configured to receive messages, data objects, or packets from the access device 108 that include the personal identifier (PIN), access code, and access identifier or access token for authorizing a transaction conducted by the user 102 at the access device 108 (authorization request message). The transaction processing computer 110 may be configured to maintain and transfer a result of an authorization process using an authorization request message (i.e., the authorization response message) to the validation computer 106 as well as information about the transaction such as the account number associated with the transaction, the type of transaction (e.g., withdrawal, deposit, transfer, etc.), a monetary amount of the transaction, and a personal identifier of the user. The transaction processing computer 110 may communicate with an authorizing computer 112 for authorizing the transaction conducted by the user 102 at the access device 108 such as by transmitting or otherwise providing the authorization request message to the authorizing computer 112 and receiving the authorization response message from the authorizing computer 112.

In embodiments, if the authorization response message indicates that the transaction is authorized, the transaction processing computer 110 may transmit the authorization response message to the access device 108 where the user 102 can conduct the intended transaction.

A method according to the embodiments of the invention can be described with respect to FIG. 1. FIG. 1 shows a process flow of a method for conducting digital access code features as described herein.

Additional methods and processes may be included within these methods and may be recognized by one of ordinary skill in the art, in light of the description below. Further, in some embodiments of the present invention, the described methods may be combined, mixed, and matched, as one of ordinary skill would recognize.

One embodiment of the invention is directed to a method. The method comprises: prompting, by an access device (e.g., an ATM machine), a user to enter an access code; receiving, by the access device, the access code from the user; transmitting, by the access device, the access code to a validation computer, which validates the access code; receiving, by the access device, an access identifier (e.g., a primary account number) or access token (e.g., a payment token) from the validation computer in response to validating the access code; transmitting, by the access device, an authorization request message including the access identifier or the access token to an authorizing computer (e.g., an issuer computer); and receiving, by the access device, an authorization response message from the authorizing computer. FIG. 1 shows a method according to the embodiment of the invention.

At step 1, user 102 may interact with user device 104 to request an access code from validation computer 106. In embodiments, the user device 104 may be configured to utilize an application and/or a digital wallet which presents a user interface enabling the user 102 to request the access code. In accordance with at least one embodiment, the user 102 may be required to authenticate with the user device 104 and/or application to request the access code from the validation computer 106. For example, the user 102 may provide a password, an answer to a security question, or utilize a biometric input to authenticate themselves with the application, user device 104, or validation computer 106 for requesting the access code. In some embodiments, the request for the access code may include the authentication data provided by the user 102 to the user device 104 or application of the user device 104 used to authenticate the user 102. In some embodiments, the request for the access code may include an identifier of the user 102 or of the user device 104 such that the validation computer 106 can determine an appropriate payment account to generate an access code corresponding to the request. In some embodiments, the request for the access code can include information from an application of the user device 104, such as login information provided by user 102, such that the validation computer 106 can identify the user and generate the appropriate access code that corresponds to their payment account and can be validated upon being received by an access device 108 as described herein.

At step 2, the validation computer 106 may identify an account number or payment account number associated with the user 102 and/or user device 104 to generate or otherwise obtain an access code. The validation computer 106 may obtain or generate an expiration time period for the access code requested by the user 102. In embodiments, the expiration time period may be of a certain length as specified by the user 102 at some previous point, by the validation computer 106 or authorizing computer 112 according to policies. For example, a given policy may determine certain expiration time periods based on the number of access code requests the user 102 has requested in a given time period (day, week, month), based on a location of the user device 104, or based on a threshold period such as not to exceed thirty minutes. In embodiments, the expiration time period can be specified by the user interacting with the user device 104 (first user device) that presents or is configured to utilize an application or user interface for specifying the expiration time period to associate with an access code or a request for an access code. In cases where the user 102 has successfully authenticated themselves with the user device 104 and/or validation computer 106, the validation computer 106 provides the access code and expiration time period to the user device 104 for display or presentation to the user 102.

At step 3, the user 102 may interact with the access device 108 by providing the access code received at step 2 from the validation computer 106. In embodiments, the access device 108 may prompt the user 102 to provide or otherwise enter the access code. It should be noted that the digital access code features described herein may include a different user (not user 102) utilizing the access code provided at step 2 to conduct a transaction on behalf of user 102 or with the authority of user 102. In such cases the different user must still know or otherwise request the PIN and access code from the user 102. In embodiments, the digital access features described herein may include a shared application or mobile application among trusted devices that enables a requested access code from one party to be shared or otherwise transmitted to another user device of another party.

At step 4, the access device 108 may transmit the access code provided by the user 102 to the validation computer 106 for validation. In embodiments, the validation computer 106 may validate the access code by determining whether the access code received from the access device 108 matches the access code provided to the user device 104. Validation of the access code by the validation computer 106 may include utilizing other factors such as identifying the status of the access code since it was provided to the user device or the status of the associated payment account. For example, the user 102 may have interacted with user device 104 which in turn communicated with the validation computer 106 to cancel the access code, and/or delete or suspend a payment account or corresponding payment card.

At step 5, if the access code is validated by the validation computer 106, the validation computer 106 may transmit a data object or data message to the access device 108 that includes a response code indicating the status of the validation (successful or not successful), the access identifier (e.g., a primary account number) or an access token (e.g., a payment token) if the validation was successful, and the access code. If validation is not successful the access device 108 will only be informed that the access code is not validated and no access identifier or access token is transmitted to the access device 108.

At step 6, if the validation was successful, the access device 108 prompts the user 102 to provide a personal identifier or PIN for conducting the transaction. The access device 108 generates an authorization request message that includes the PIN, the access identifier or the access token as well as transaction details or information (transaction type, account type, amount of transaction (if applicable) etc.). The access device 108 transmits the authorization request message along with a transaction time and date to the transaction processing computer 110 for authorizing the transaction. In embodiments, the transaction processing computer 110 is configured to resolve the access token received from the access device 108 to determine a primary account number such as by performing a mapping of data included in the access token to determine the primary account number or decrypting data included in the payment token or the payment token itself to determine the primary account number.

At steps 7 and 8 the transaction processing computer 110 and authorizing computer 112 authorizes or declines the transaction utilizing the authorization request message from the access device 108. The authorizing computer 112 generates an authorization response message which is transmitted to the transaction processing computer 110 which indicates that the transaction being conducted by user 102 is authorized or declined. At the end of the day or at any other suitable period of time, a clearing and settlement process may occur between the transaction processing computer 110 and authorizing computer 112.

At step 9, the transaction processing computer 110 transmits the authorization response message to the access device 108 which enables the user 102 to conduct the transaction (if authorized) or not conduct the transaction (if declined) as indicated by the authorization response message.

At step 10, the transaction processing computer 110 communicates the result of the authorization (authorization response message) to the validation computer 106. In embodiments, the validation computer 106 maintains a status of access codes, usage of access codes, and results of transactions conducted utilizing the access codes.

At step 11, the validation computer 106 generates and transmits a notification or message to the user device 104 indicating whether a transaction was successfully conducted or not successfully conducted using the access code and as well as what time and date the transaction was conducted.

Figure 2:
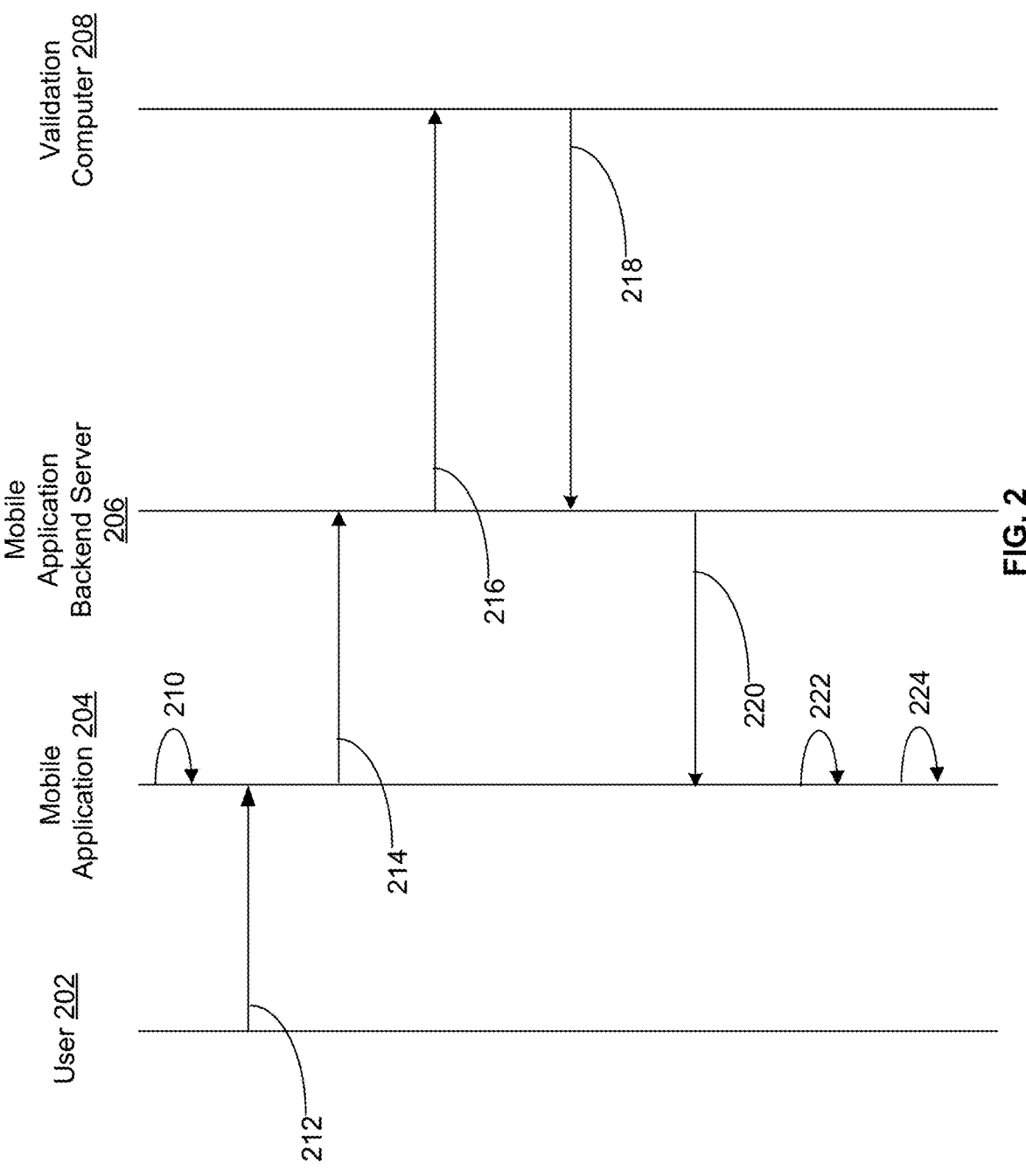
FIG. 2 shows a swim-lane diagram including a process flow according to an embodiment of the invention.

FIG. 2 shows a swim-lane diagram illustrating a process flow according to an embodiment of the invention. FIG. 2 shows a method for retrieving or obtaining an active or issued access code.

Some or all of the process 200 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 200 of FIG. 2 (as well as other figures in this application) may be performed by at least the one or more components including the user device 104, validation computer 106, access device 108, transaction processing computer 110. In embodiments, the validation computer may include the mobile application backend server. In some embodiments, the mobile application backend server may be a separate component that is in communication with the validation computer 106, user device 104, and/or transaction processing computer 110. The code may be stored on a computer-readable storage medium, for example, in the form of a computer program including a plurality of instructions executable by one or more processors. The computer-readable storage medium may be non-transitory. FIG. 2 includes a user 202, a mobile application 204, a mobile application backend server 206, and a validation computer 208.

The process 200 may include, at 210, displaying by the mobile application 204 a display access code button or feature of a user interface for requesting an access code. In embodiments, the user 202 may be required to authenticate with the mobile application via a password, security question answer technique, or biometric technique. The process 200 may include at 212 receiving input from the user 202, at the user device, for selecting an access code. In embodiments, the mobile application 204 may present a plurality of existing access codes where each access code is associated with a different access identifier or access token, request, and issuer. The process 200 may include at 214 retrieving existing access codes for a particular access identifier or access token. The process 200 may include at 216 the mobile application backend server 206 requesting from the validation computer 208 the access codes for the access identifier or access token. The process 200 may include at 218 transmitting the existing access codes and associated expiration times for each access code to the mobile application backend server 206. The process 200 may include at 220 transmitting the existing access codes and associated expiration times from the mobile backend server 206 to the mobile application 204. At 222 the process 200 may include displaying the active or existing access codes along with the associated expiration time periods for each access code to the user via the mobile application 204. In embodiments, the process 200 may include at 224 updating a user interface of the mobile application 204 to present geographic locations of one or more access devices where the access codes can be utilized to conduct a transaction.

Figure 3:
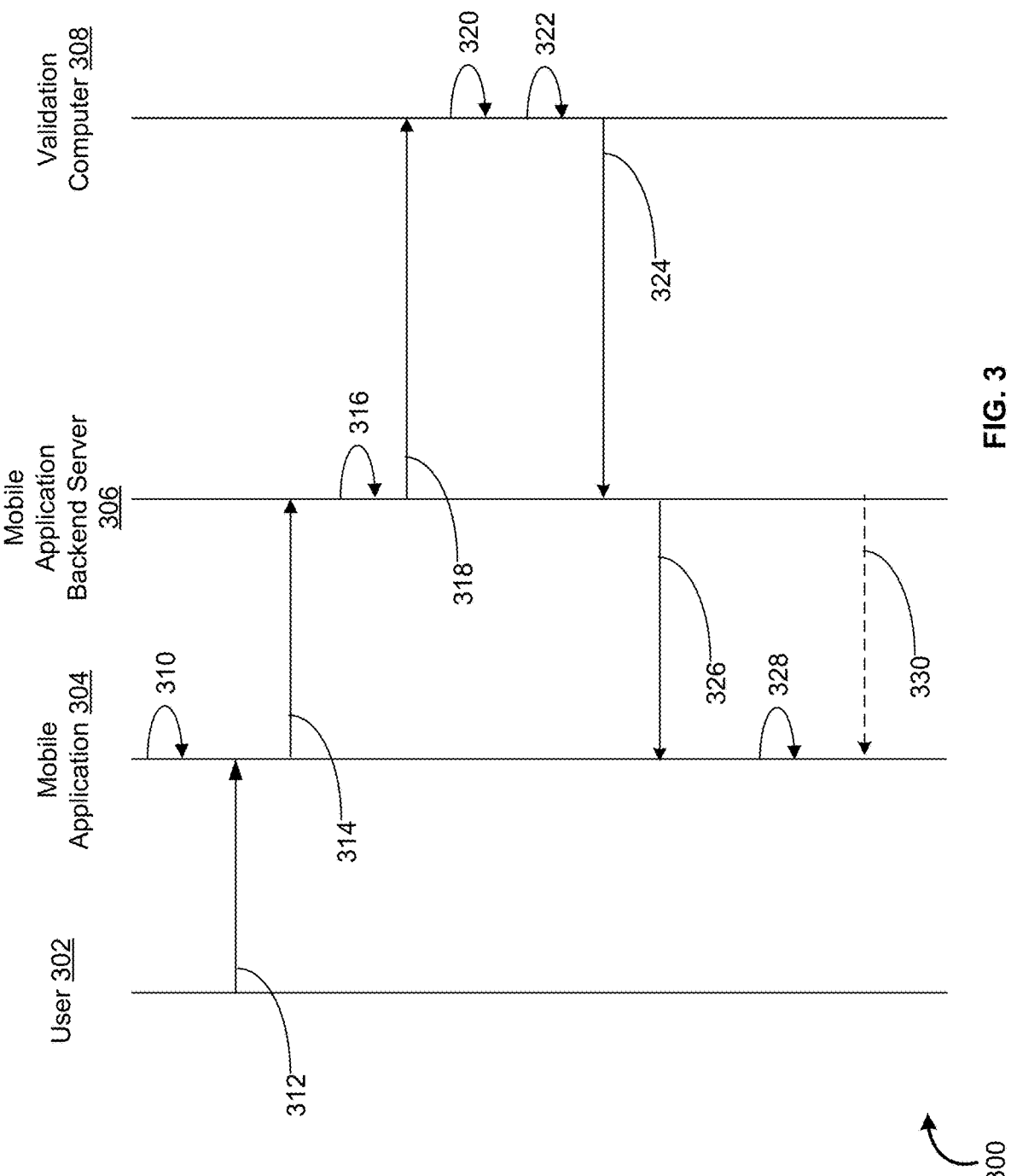
FIG. 3 shows a swim-lane diagram including a process flow according to an embodiment of the invention.

FIG. 3 shows a swim-lane diagram including a process flow according to an embodiment of the invention. FIG. 3 shows a method for requesting a new access code.

FIG. 3 includes a user 302, a mobile application 304, a mobile application backend server 306, and a validation computer 308. The process 300 may include displaying an option or feature via the mobile application 304 to the user 302 for requesting an access code at 310. The process 300 may include receiving input or an indication of an interaction by the user 302 with the mobile application 304 and the request for the access code at 312. In embodiments, the process 300 may include an indication of a delivery channel for the access code from the user 302 when the user 302 requests the access code at 312 by interacting with the mobile application 304 of the user device. The process 300 may include the mobile application 304 transmitting the request for the access code to the mobile application backend server 306 at 314. The process 300 may include the mobile application backend server 306 obtaining or retrieving the access identifier or access token associated with the user 302 or user device that requested the access code as well as an expiration for the access identifier or access token at 316.

The process 300 may include the mobile application backend server 306 requesting an access code from the validation computer 308 at 318. In embodiments, the request from the mobile application backend server 306 may include the access token or access identifier and expiration date for the access identifier or access token. The process 300 may include the validation computer 308 generating an access code at 320. The process 300 may include the validation computer 308 associating the access identifier or access token, expiration date, and access code at 322. In embodiments, the validation computer 308 may generate an expiration time period to associate with the access code which is also linked or associated with the access token or access identifier and expiration date. The process 300 may include transmitting the access code and expiration time period from the validation computer 308 to the mobile application backend server 306 at 324. The process 300 may include the mobile application backend server 306 transmitting the access code and expiration time period to the mobile application 304 at 326. The process 300 may include the mobile application 304 displaying or presenting the access code and expiration time period to the user 302 via a user interface of the mobile application 304 at 328. In some embodiments, the transmittal of the access code and expiration time period are transmitted to the mobile application 304 via a push notification as indicated by 330 which may be optional depending on delivery channel preferences of the user 302 to request access codes.

Figure 4:
FIG. 4 shows a swim-lane diagram including a process flow according to an embodiment of the invention.

FIG. 4 shows a swim-lane diagram including a process flow according to an embodiment of the invention. FIG. 4 shows a method for providing a notification that the access code was successfully validated.

FIG. 4 includes a user 402, a mobile application 404, a mobile application backend server 406, and a validation computer 408. The process 400 may include generating and transmitting, by the validation computer 408, an access code validated successfully message to the mobile application backend server 406 at 410. The process 400 may include transmitting the access code validated successfully message from the mobile application backend server 406 to the mobile application 404 at 412. In embodiments, the validated successfully message from the mobile application backend server 406 to the mobile application 404 may be provided as a push notification message. In embodiments, the validation computer 408 and mobile application backend server 406 may also be configured to generate and transmit a unsuccessful validated message in cases where the access code is not validated by the validation computer as described herein.

Figure 5:
FIG. 5 shows a swim-lane diagram including a process flow according to an embodiment of the invention.

FIG. 5 shows a swim-lane diagram including a process flow according to an embodiment of the invention. FIG. 5 shows a method for canceling an already issued or generated access code.

FIG. 5 includes a user 500, a mobile application 502, a mobile application backend server 504, and a validation computer 506. The process 500 includes a user 500 interacting with the mobile application 502 at 508 to indicate a cancelation of an access code or a deletion or suspension of a payment card at 508. In embodiments, the mobile application 502 may transmit the cancelation of the access code or the deletion or suspension of the payment card to the mobile application backend server 504 at 510. In embodiments, the cancelation of an access code may occur at any time after a user 500 has requested an access code. The process 500 may include transmitting, by the mobile application backend server 504, the cancelation of the access code or the deletion or suspension of the payment card to the validation computer 506 at 512. The process 500 may include canceling the access code or deleting or suspending the payment card by the validation computer 506 at 514. In embodiments the validation computer 506 may communicate with one or more components to process the cancelation of the access code or deleting or suspending the payment card such as by communicating with an authorizing computer.

Figure 6:
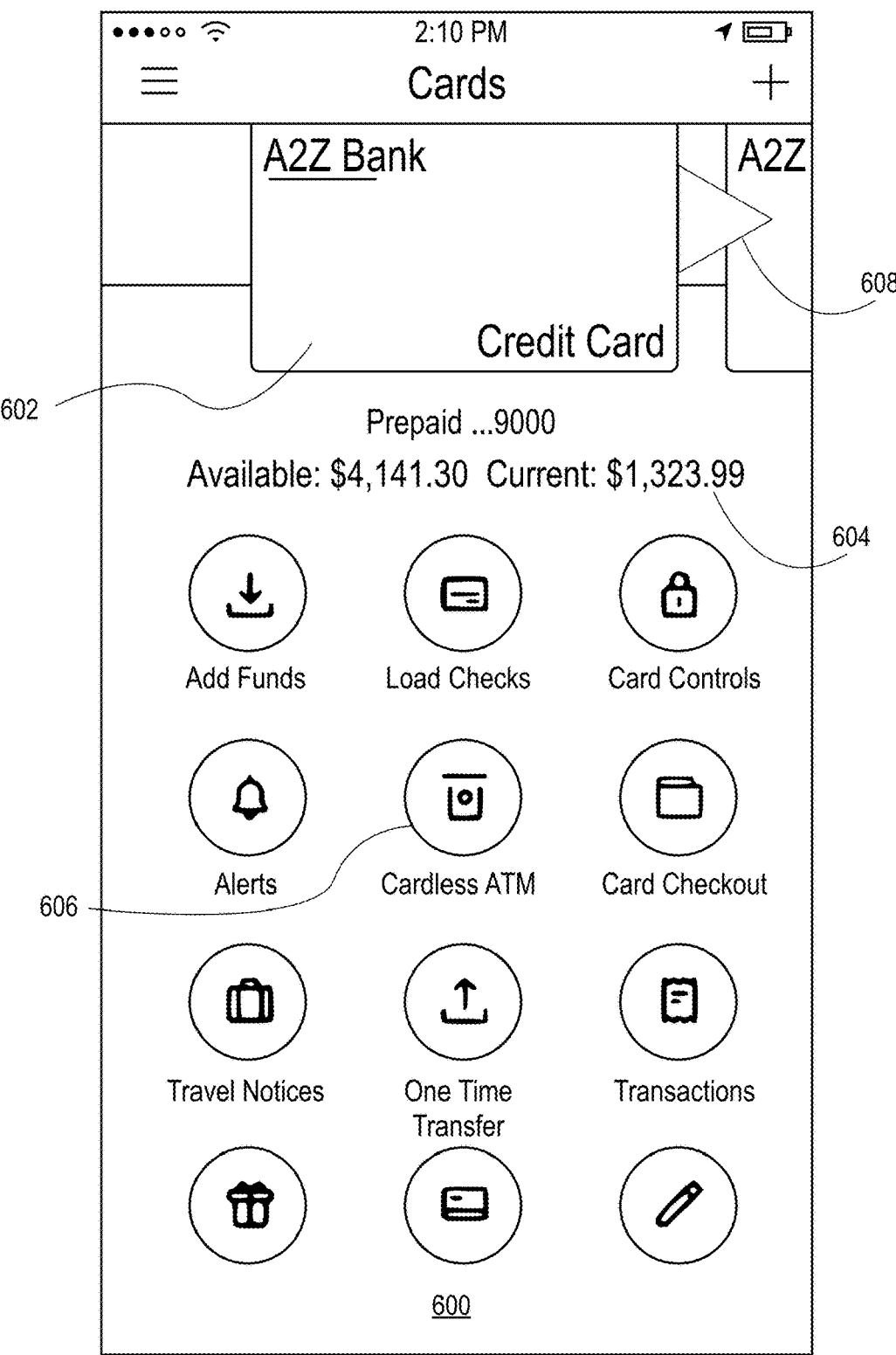
FIG. 6 shows an example user interface for a digital access code feature according to an embodiment of the invention.

FIG. 6 shows an example user interface for a digital access code feature according to an embodiment of the invention. FIG. 6 illustrates a user interface 600 that represents a home page or origination point in an application such as a mobile application for implementing the digital access code features described herein. The example user interface 600 may include one or more options to select appropriate payment accounts or payment cards at 602, balance information for a selected payment account or payment card at 604, as well as an option to request an access code at 606 such as by interacting with a card less ATM feature. In embodiments, a user may interact with the user interface 600 to scroll 608 through available payment cards or payment accounts associated with the user. In accordance with at least one embodiment, the user interface 600 may be presented via a user device of the user. As described herein, a user may be required to authenticate themselves with the application or mobile application represented by user interface 600 prior to requesting an access code 606.

Figure 7:
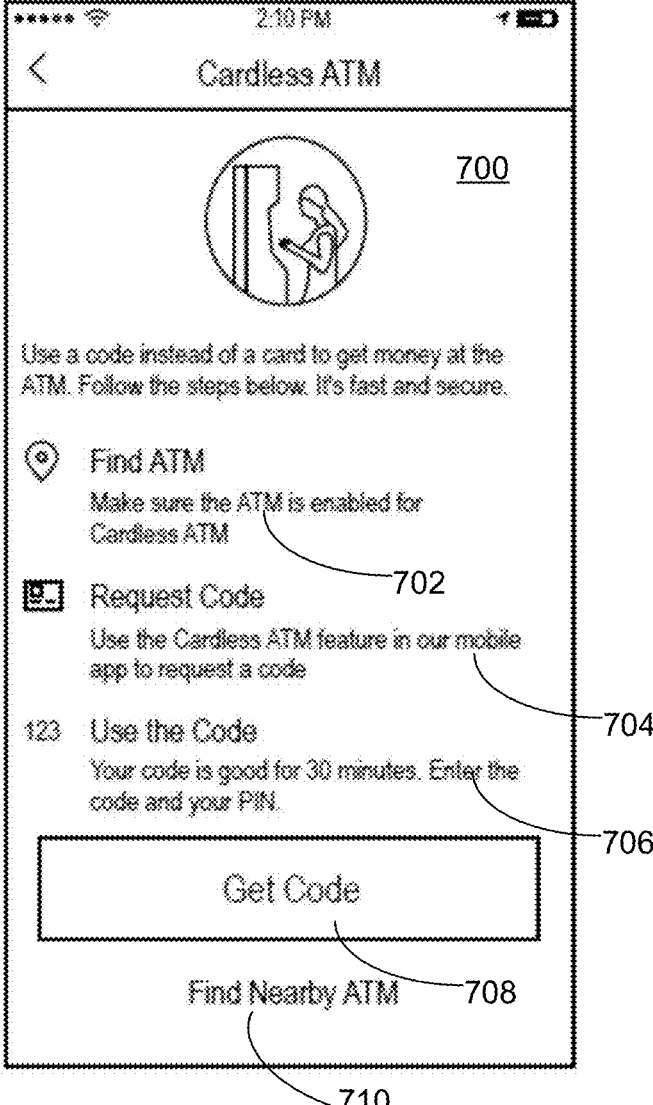
FIG. 7 shows an example user interface for a digital access code feature according to an embodiment of the invention.

FIG. 7 shows an example user interface for a digital access code feature according to an embodiment of the invention. FIG. 7 illustrates several features that may be presented via user interface 700 upon a user requesting an access code or interacting with the card less ATM feature 606 of user interface 600. The user interface 700 presented to a user via a user device may include several options or features including an option to locate an ATM or access device that is configured to utilize access codes at 702, request an access code at 704, or use an access code at 706. The user interface may also include buttons or other features for requesting an access code at 708 or locating a nearby ATM or access device at 710. As illustrated by FIG. 7 at 706 the user interface 700 may inform a user of the expiration time period associated with an access code. The find ATM or access device feature 702 may be utilized by a user to identify a geographic location of an ATM or access device that is configured for using the access code to conduct a transaction. This can enable a user to find an appropriate access device without attempting to provide an access code to an access device that is not enabled to conduct a transaction using the access code.

Figure 8:
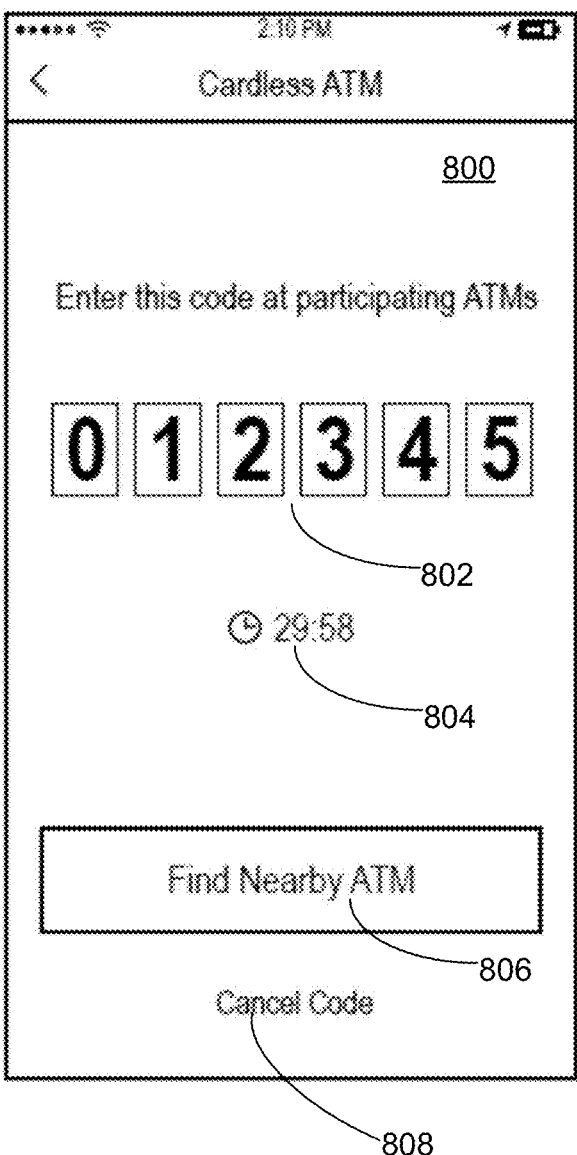
FIG. 8 shows an example user interface for a digital access code feature according to an embodiment of the invention.

FIG. 8 shows an example user interface for a digital access code feature according to an embodiment of the invention. FIG. 8 includes user interface 800 which is displaying or presenting an access code 802 as well as an associated expiration time period for utilizing the access code 804. The user interface 800 also includes features for locating an access device or ATM 806 which the user can interact with to utilize the access code 802. As described herein, the user interface 800 may also include a feature for canceling an active access code (i.e., an access code that has not been active past the associated expiration time period) at 808. A user may interact with user interface 800 to cancel a plurality of existing or active access codes. Other features (not pictured) may be presented to a user via the application and user interface for canceling a payment card or suspending a payment card or account.

Figure 9:
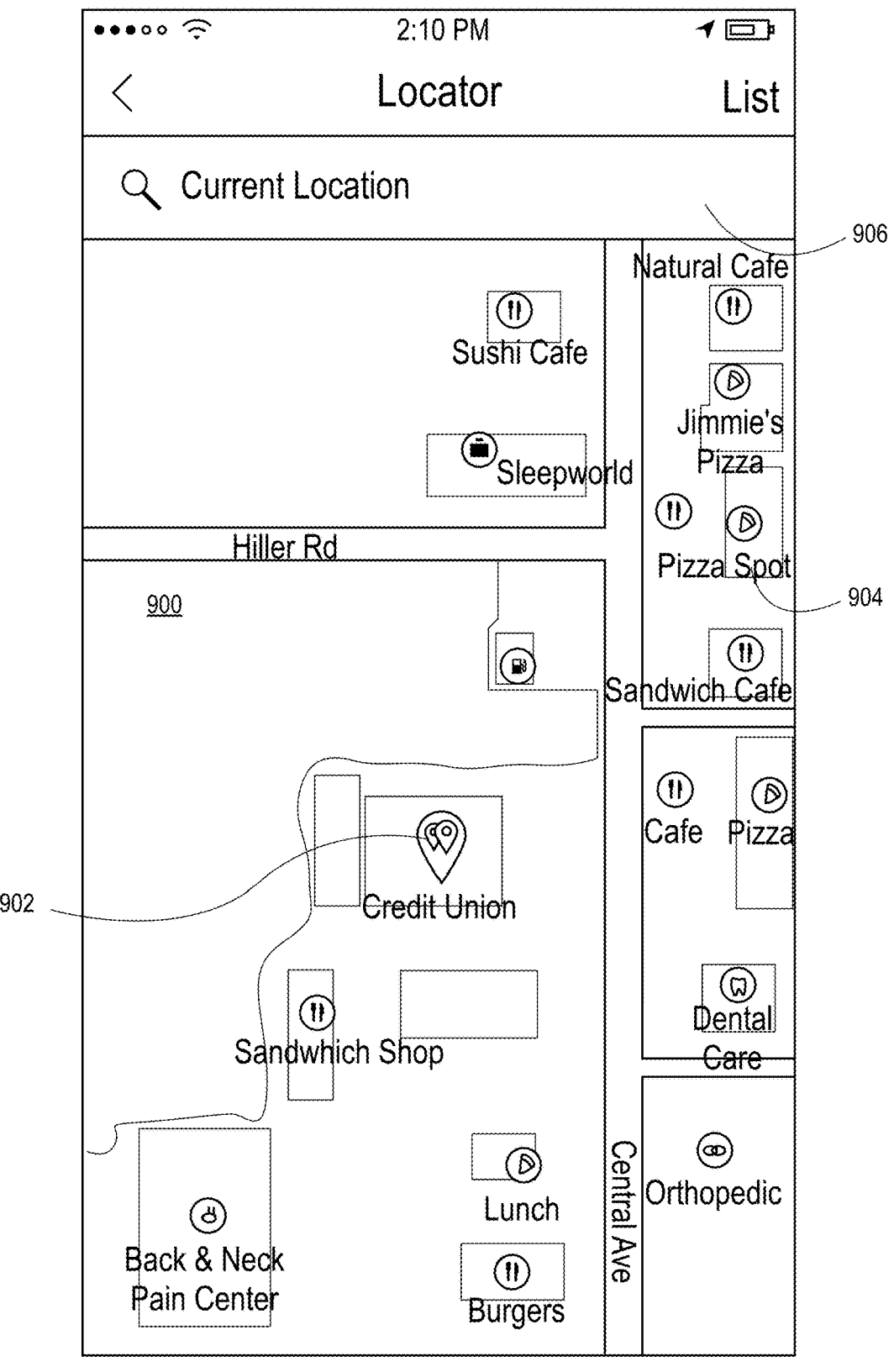
FIG. 9 shows an example user interface for a digital access code feature according to an embodiment of the invention.

FIG. 9 shows an example user interface for a digital access code feature according to an embodiment of the invention. FIG. 9 includes user interface 900 for displaying a geographic location of access devices that can utilize the access code 902 as well as other qualifying resource providers or merchants who can utilize the access code at 904. The user interface 900 also includes a feature for identifying the access devices in a current location that can use the access codes or to search for access devices 906 that can use the access code in other locations such as other neighborhoods, cities, or states.

Figure 10:
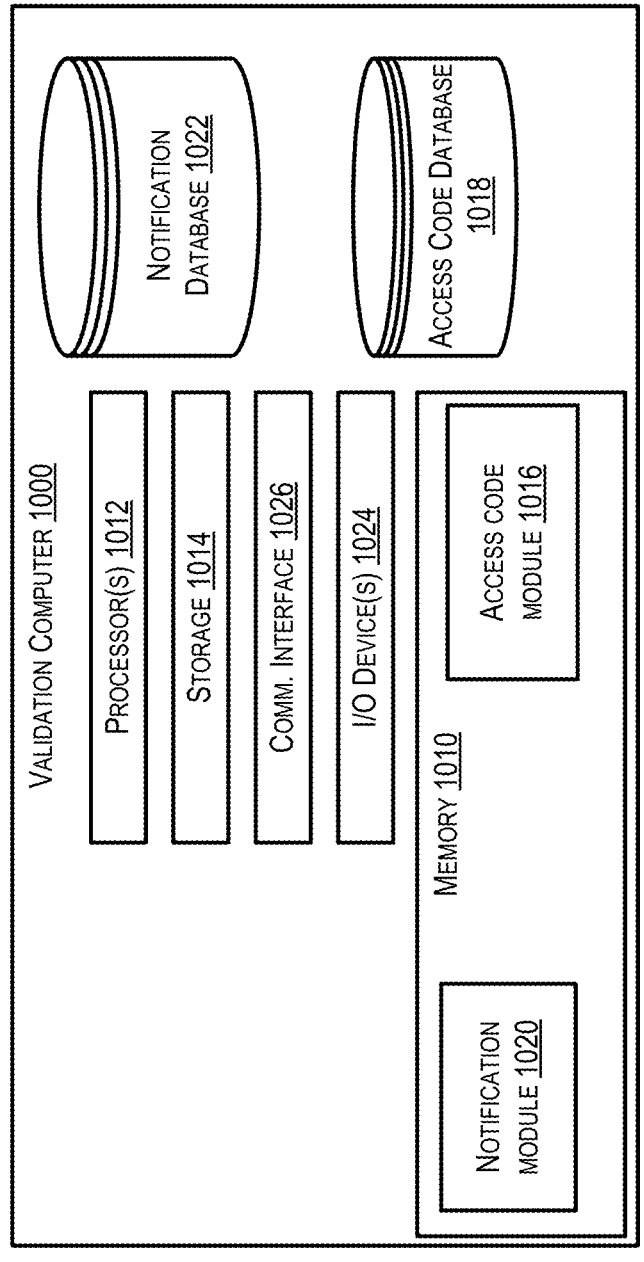
FIG. 10 shows a block diagram of an exemplary validation computer according to an embodiment of the invention.

FIG. 10 shows a block diagram of an exemplary validation computer according to an embodiment of the invention. The validation computer 1000 may be implemented to provide a digital access feature in accordance with embodiments of the disclosure. In embodiments, a validation computer 1000 may be in communication with one or more components of FIG. 1 such as user device 104, access device 108, and transaction processing computer 110 via network connections. The network connections may include at least a transaction processing network. In some embodiments, the validation computer 1000 may be an example of validation computer 106 of FIG. 1.

In embodiments, the validation computer 1000 may include at least one memory 1010 and one or more processing units (or processor(s)) 1012. The processor(s) 1012 may be implemented as appropriate in hardware, computer-executable instructions, firmware, or combinations thereof. Computer-executable instruction of firmware embodiments of the processor(s) 1012 may include computer-executable or machine executable instructions written in any suitable programming language to perform the various functions described.

The memory 1010 may store program instructions that are loadable and executable on the processor(s) 1012, as well as data generated during the execution of these programs. Depending on the configuration and type of validation computer 1000, the memory 1010 may be volatile (such as random access memory (RAM)) and/or non-volatile (such as read-only memory (ROM), flash memory, etc.). The validation computer 1000 may also include additional storage 1014, such as either removable storage or non-removable storage including, but not limited to, magnetic storage, optical disks, and/or tape storage. The disk drives and their associated computer-readable media may provide non-volatile storage of computer-readable instructions, data structures, program modules, and other data from the validation computer 1000. In some embodiments, the memory 1010 may include multiple different types of memory, such as static random access memory (SRAM), dynamic random access memory (DRAM) or ROM.

Turning to the contents of memory 1010 in more detail, the memory 1010 may include an operating system and one or more application programs or services for implementing the features disclosed herein including at least a module for processing requests for access codes (access code module 1016) using data from the access code database 1018, and a module for generating and transmitting notifications or messages to other computers or servers (notification module 1020) using data from notification database 1022. In embodiments, the access code module 1016 and notification module 1020 may process requests for access codes including generating access codes, generating and maintaining expiration time periods, validating access code requests from an access device, and generating and transmitting access codes as well as validation request responses including an access identifier or access token upon a successful validation to an access device. The access code module 1016 may be configured to generate messages or responses to validation access code requests which include a result of the validation of an access code as well as the access identifier or access token. The response to the validation access code requests can be utilized by the access device for generating and transmitting an authorization request message upon requesting and receiving a PIN from a user to conduct a transaction.

In accordance with at least one embodiment, the access code module 1016 may be configured to cancel previously requested access codes upon receiving a cancel request from a user device as well as verify validation of an access code by communicating with an authorizing computer regarding the status of an associated access identifier, access token, or payment account such as the case when a user has canceled a payment card or account or suspended a payment card or account. In embodiments, the validation computer 1000 may store the results of validating access codes as well as the status of access codes (existing or active, inactive, declined) in the access code database 1018. In accordance with at least one embodiment, the notification module 1020 may be configured to generate and transmit messages, data messages, or data objects that can be utilized by an application of a user device or by an access device to indicate an access code, a status of an access code, or a status of a validation procedure for an access code provided by an access device. The notification module 1020 may be configured to provide messages or data to a user device, such as a status of an access code, via particular communication channels (e.g., SMS text or email) based on preferences specified by a user or an issuer.

The validation computer 1000 may also contain communication interface(s) 1024 that enable the validation computer 1000 to communicate with a stored database, another computing device or server, one or more remote devices, other application servers, and/or any other suitable electronic devices included in FIGS. 1-5. In some embodiments, the communication interface 1024 may enable the validation computer 1000 to communicate with other electronic devices on a network (e.g., on a private network). The validation computer 1000 may also include input/output (I/O) device(s) and/or ports 1026, such as for enabling connection with a keyboard, a mouse, a pen, a voice input device, a touch input device, a display, speakers, a printer, etc.

Figure 11:
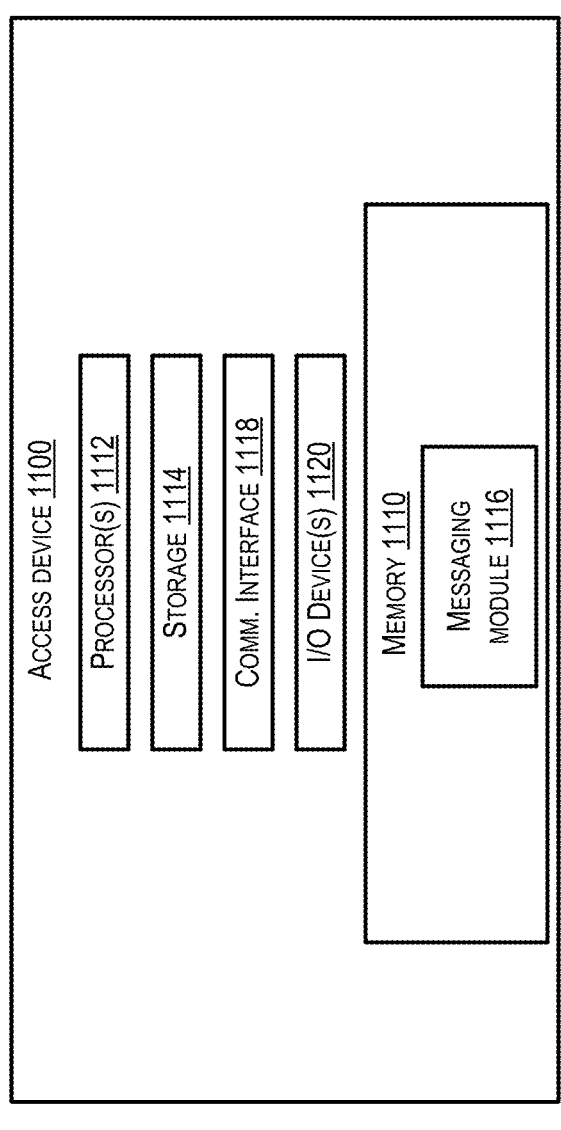
FIG. 11 shows a block diagram of an access device according to an embodiment of the invention.

FIG. 11 shows a block diagram of an access device according to an embodiment of the invention. The access device 1100 may be implemented to provide a digital access feature in accordance with embodiments of the disclosure. In embodiments, a access device 1100 may be in communication with one or more components of FIG. 1 such as user device 104, validation computer 106, and transaction processing computer 110 via network connections. The network connections may include at least a transaction processing network. In some embodiments, the access device 1100 may be an example of access device 108 of FIG. 1.

In embodiments, the access device 1100 may include at least one memory 1110 and one or more processing units (or processor(s)) 1112. The processor(s) 1112 may be implemented as appropriate in hardware, computer-executable instructions, firmware, or combinations thereof. Computer-executable instruction of firmware embodiments of the processor(s) 1112 may include computer-executable or machine executable instructions written in any suitable programming language to perform the various functions described.

The memory 1110 may store program instructions that are loadable and executable on the processor(s) 1112, as well as data generated during the execution of these programs. Depending on the configuration and type of access device 1100, the memory 1110 may be volatile (such as random access memory (RAM)) and/or non-volatile (such as read-only memory (ROM), flash memory, etc.). The access device 1100 may also include additional storage 1114, such as either removable storage or non-removable storage including, but not limited to, magnetic storage, optical disks, and/or tape storage. The disk drives and their associated computer-readable media may provide non-volatile storage of computer-readable instructions, data structures, program modules, and other data from the access device 1100. In some embodiments, the memory 1110 may include multiple different types of memory, such as static random access memory (SRAM), dynamic random access memory (DRAM) or ROM.

Turning to the contents of memory 1110 in more detail, the memory 1110 may include an operating system and one or more application programs or services for implementing the features disclosed herein including at least a module for generating and processing requests for utilizing access codes, PINs, and conducting a transaction (messaging module 1016). In embodiments, the messaging module 1116 may process requests for utilizing access codes including transmitting access codes as well as validation requests for access codes to a validation computer. The messaging module 1116 may be configured to prompt a user for a PIN upon receiving a successful validation of an access code from a validation computer. In embodiments, the messaging module 1116 may be configured to generate and transmit an authorization request message to the authorizing computer that includes the access code, the PIN, and the access identifier or the access token from the validation computer. The messaging module 1116 may be configured to receive and process an authorization response message from the authorizing computer which enables the access device 1100 to decline or authorize and conduct a transaction conducted by a user at the access device 1100 as described herein.

The access device 1100 may also contain communication interface(s) 1118 that enable the validation computer 1000 to communicate with a stored database, another computing device or server, one or more remote devices, other application servers, and/or any other suitable electronic devices included in FIGS. 1-5. In some embodiments, the communication interface 1118 may enable the access device 1100 to communicate with other electronic devices on a network (e.g., on a private network). The access device 1100 may also include input/output (I/O) device(s) and/or ports 1120, such as for enabling connection with a keyboard, a keypad, a mouse, a pen, a voice input device, a touch input device, a display, speakers, a printer, etc.

Figure 12:
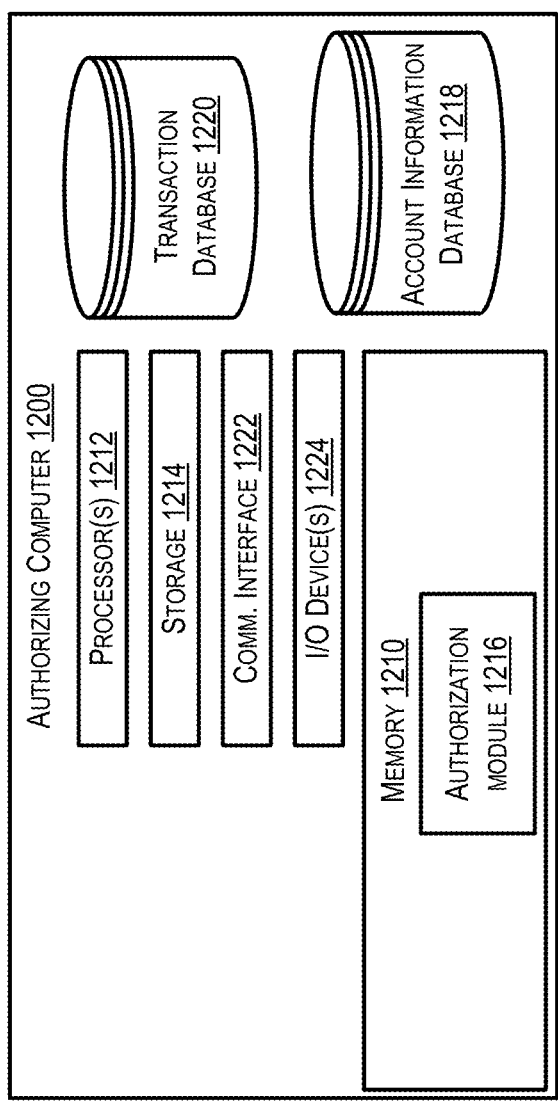
FIG. 12 shows a block diagram of an authorizing computer according to an embodiment of the invention.

FIG. 12 shows a block diagram of an authorizing computer according to an embodiment of the invention. The authorizing computer 1200 may be implemented to provide a digital access feature in accordance with embodiments of the disclosure. In embodiments, a authorizing computer 1200 may be in communication with one or more components of FIG. 1 such as user device 104, access device 108, and validation computer 106 via network connections. The network connections may include at least a transaction processing network. In some embodiments, the authorizing computer 1200 may be an example of transaction processing computer 110 of FIG. 1.

In embodiments, the authorizing computer 1200 may include at least one memory 1210 and one or more processing units (or processor(s)) 1212. The processor(s) 1212 may be implemented as appropriate in hardware, computer-executable instructions, firmware, or combinations thereof. Computer-executable instruction of firmware embodiments of the processor(s) 1212 may include computer-executable or machine executable instructions written in any suitable programming language to perform the various functions described.

The memory 1210 may store program instructions that are loadable and executable on the processor(s) 1212, as well as data generated during the execution of these programs. Depending on the configuration and type of authorizing computer 1200, the memory 1210 may be volatile (such as random access memory (RAM)) and/or non-volatile (such as read-only memory (ROM), flash memory, etc.). The authorizing computer 1200 may also include additional storage 1214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data from the authorizing computer 1200. In some embodiments, the memory 1210 may include multiple different types of memory, such as static random access memory (SRAM), dynamic random access memory (DRAM) or ROM.

Turning to the contents of memory 1210 in more detail, the memory 1210 may include an operating system and one or more application programs or services for implementing the features disclosed herein including at least a module for processing authorization request messages and authorization response messages (authorization module 1216) using data from the account information database 1218. In embodiments, the authorizing computer 1200 may store results of authorization request messages (authorization response messages) as well as information associated with the authorization request messages in transaction database 1220. In embodiments, the authorization module 1216 may process authorization message requests and authorization response messages. The authorization module 1216 may be configured to communicate the authorization response message to an access device or a transaction processing computer for conducting a transaction with a user as well as to the validation computer for generating and transmitting notifications to a user device indicating the status of a transaction. In embodiments, the authorization module 1216 may update and maintain the statuses of one or more payment cards or payment accounts associated with a user in account information database 1218. The authorizing computer 1200 may communicate the status of a payment card or payment accounts to the transaction processing computer and/or the validation computer in response to a request for a cancelation or suspension of a payment card or payment account.

The authorizing computer 1200 may also contain communication interface(s) 1222 that enable the authorizing computer 1200 to communicate with a stored database, another computing device or server, one or more remote devices, other application servers, and/or any other suitable electronic devices included in FIGS. 1-5. In some embodiments, the communication interface 1222 may enable the authorizing computer 1200 to communicate with other electronic devices on a network (e.g., on a private network). The authorizing computer 1200 may also include input/output (I/O) device(s) and/or ports 1224, such as for enabling connection with a keyboard, a mouse, a pen, a voice input device, a touch input device, a display, speakers, a printer, etc.

FIG. 13 shows a flow diagram for a digital access code feature according to an embodiment of the invention. FIG. 13 illustrates process 1300 which can be performed by an access device depicted in FIGS. 1-5 and 11.

Process 1300 may begin at 1302 by prompting entry of an access code. In embodiments, the access device may prompt a user for the access code to initiate at transaction that utilizes the digital access features described herein. In some embodiments, the prompt to initiate the transaction may be transmitted to the user device via available networks where the user may provide the access code via their own user device. In embodiments, the prompt to initiate the transaction may be transmitted or otherwise provided to the user device based on the location of the user device with respect to the access device. For example, the user device may be required to be within a certain distance of the access device to utilize the user device as the device for providing the access code as opposed to providing the access code at the access device. The certain distance may be based on a type of communication network or channel utilized. For example, the certain distance may be an optimal distance that works with Bluetooth technology or near field communications technology. The process 1300 may include receiving the access code from the user by the access device at 1304.

The process 1300 may include transmitting the access code to a validation computer for validation at 1306. The process 1300 may include receiving an access identifier or access token from the validation computer in response to validating the access code at 1308. In embodiments, if the access code is not validated because it does not match the access code that was previously provided to the user device, it has subsequently been canceled by the user, the payment account has been suspended or canceled, or it is being used outside of the expiration time period, the access identifier or access token is not provided to the access device by the validation computer. The process 1300 may include transmitting an authorization request message including the access identifier or the access token to an authorizing computer at 1310. The process 1300 may conclude at 1312 by receiving an authorization response message from the authorizing computer. In some embodiments, the authorization response message may indicate that the transaction is authorized and may continue or that the transaction is not authorized and will not continue.

FIG. 14 shows a flow diagram for a digital access code feature according to an embodiment of the invention. FIG. 14 illustrates process 1400 which can be performed by an access device depicted in FIGS. 1-5 and 10.

The process 1400 may begin at 1402 by receiving, by a validation computer and from a first user device, a request for an access code. The process 1400 may include determining, by the validation computer, the access code associated with an account number corresponding to the first user device at 1404. For example, the validation computer may generate a unique access code for the account number associated with the first user device upon receiving the request for the access code. The process 1400 may include transmitting, by the validation computer, the access code to the first user device at 1406. In embodiments, the validation computer may maintain information which indicates a preference for a certain communication channel to provide the access code to the first user device. For example, the validation computer may provide the access code to the first user device via a push notification of an application of the first user device, via a short message service (SMS) text message, via email, or via a phone call.

The process 1400 may include receiving, by the validation computer and from an access device, the access code at 1408. The process 1400 may include validating, by the validation computer, the access code based at least in part on the access code associated with the request at 1410. In embodiments, validation of the access code may include determining that the access code that was previously provided to the first user device matches the access code received at 1408, determining that the access code is not being used outside of the associated expiration time period, and/or that some other account activity has not occurred which suspends the access code or associated payment account. In some embodiments, the access code may be received by the access device from a second user device. In embodiments, the user (first user) associated with the first user device may transmit, provide, or otherwise authorize another user (a second user) associated with a second user device to utilize the access code to conduct a transaction at the access device on their behalf or with their authority. In such cases, the user (first user) may receive notifications from the validation computer indicating when the access code was utilized and the result of the transaction (e.g., the validation of the access code was successful, a transaction was successfully conducted, etc.). The process 1400 may include generating, by the validation computer, a message that includes the account number associated with the access code in accordance with a determination that the access code is validated at 1412. The process 1400 may conclude at 1414 by transmitting, by the validation computer, the message to the access device.

It can be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

prompting, by an access device, a user to enter an access code, responsive to prompting the user to enter the access code, receiving, by the access device, the access code from the user;

transmitting, by the access device, the access code to a validation computer, wherein the access code is transmitted directly from the access device to the validation computer, wherein the access device and the validation computer communicate by invoking an application programming interface (API) that uses mutual secure socket layer authentication and channel encryption, and wherein the validation computer is programmed to identify a stored user-specified delivery channel, selected by the user from options including an email and an application push notification, use the user-specified delivery channel to provide the access code to a user device of the user, validate the access code received from the access device based on an expiration time period for the access code, the expiration time period determined based on one or more policies including a number of access requests previously transmitted by the user device compared to a time period, and whether the access code was received from the user device;

receiving, by the access device, an account number or payment token from the validation computer in response to validating the access code;

prompting, by the access device, the user for a PIN;

generating, by the access device, an authorization request message including the PIN and the account number or the payment token;

transmitting, by the access device, the authorization request message and a transaction time and date to an authorizing computer;

receiving, by the access device, an authorization response message from the authorizing computer, wherein the authorization response message includes an authorization response generated based on the PIN and the account number or the payment token; and based on the authorization response message, conducting, by the access device, a transaction with the user.

2. The method of claim 1, wherein the access device is an ATM.

3. The method of claim 1, further comprising:

generating a notification indicating a result of authorization by the authorizing computer; and transmitting the notification to the user device which is associated with the user.

4. The method of claim 3, wherein the notification includes the access code and a geographic location of the access device associated with the authorization.

5. The method of claim 1, wherein the authorizing computer maintains information including the account number which is associated with the user, a type of transaction, a monetary amount of the transaction, and a personal identifier of the user.

6. A system comprising an access device comprising:

a processor;

a wireless communication device coupled to the processor; and a memory element including instructions that, when executed with the processor, cause the access device to at least:

prompt a user for an access code, responsive to prompting the user to enter the access code, receive the access code from the user;

transmit the access code to a validation computer, wherein the access code is transmitted directly from the access device to the validation computer, and wherein the access device and the validation computer communicate by invoking an application programming interface (API) that uses mutual secure socket layer authentication and channel encryption, and wherein the validation computer is programmed to:

identify a stored user-specified delivery channel, selected by the user from options including an email and an application push notification, use the user-specified delivery channel to provide the access code to a user device of the user, and validate the access code based on an expiration time period for the access code, determined based on one or more policies including a number of access requests previously transmitted by the user device compared to a time period, and whether the access code was received from the user device;

receive an account number or payment token in response to validating the access code by the validation computer;

prompt the user for a PIN;

generate an authorization request message including the PIN and the account number or the payment token;

transmit the authorization request message and a transaction time and date to an authorizing computer;

receive, from the authorizing computer, an authorization response message, wherein the authorization response message includes an authorization response generated based on the PIN and the account number or the payment token; and based on the authorization response message, conduct a transaction with the user.

7. The access device of claim 6, wherein the access device is an ATM.

8. The access device of claim 6, wherein the instructions when executed with the processor further cause the access device to at least:

generate a notification indicating a result of authorization by the authorizing computer; and transmit the notification to the user device which is associated with the user.

9. The access device of claim 8, wherein the notification includes the access code and a geographic location of the access device associated with the authorization.

10. The access device of claim 6, wherein the authorizing computer maintains information including the account number which is associated with the user, a type of transaction, a monetary amount of the transaction, and a personal identifier of the user.

11. The access device of claim 6, wherein the one or more policies for the expiration time period are specified by the user.

12. The access device of claim 6, wherein the one or more policies for the expiration time period are specified by an issuer.

13. The access device of claim 6, wherein the authorization request message includes transaction information, the transaction information including a type of transaction associated with the prompt for the access code or an amount of the transaction associated with the prompt for the access code.

14. The access device of claim 6, wherein the authorizing computer stores previously generated authorization response messages.

15. The method of claim 1, wherein providing the access code to the user device of the user comprises causing display of a graphical user interface (GUI) on the user device, the GUI comprising the access code.

16. The method of claim 15, wherein the GUI further comprises a user-selectable option for identifying a nearby access device, and wherein upon user selection of the option, a map comprising the access device is displayed on the user device.

17. The access device of claim 6, wherein providing the access code to the user device of the user comprises causing display of a graphical user interface (GUI) on the user device, the GUI comprising the access code.

18. The access device of claim 17, wherein the GUI further comprises a user-selectable option for identifying a nearby access device, and wherein upon user selection of the option, a map comprising the access device is displayed on the user device.

\* \* \* \* \*